United States Patent [19]  [11] 4,021,585
Svoboda et al.  [45] May 3, 1977

[54] CHLORINE DIOXIDE SPRAY PROCESS FOR CHILLING MEAT CARCASSES

[75] Inventors: Donald J. Svoboda, Florissant; Loretta E. Schwerdt, St. Peters, both of Mo.

[73] Assignee: Krey Packing Company, St. Louis, Mo.

[22] Filed: Jan. 16, 1976

[21] Appl. No.: 649,912

[52] U.S. Cl. .................................. 426/332; 21/58; 424/130; 426/310; 426/318
[51] Int. Cl.² ........................ A23B 4/00; A23B 4/14
[58] Field of Search .......... 426/332, 310, 304, 318, 426/320, 524, 264, 418; 21/58; 8/108.5, 94.15; 424/130, 149

[56] References Cited

UNITED STATES PATENTS

| | | |
|---|---|---|
| 2,451,897 | 10/1948 | Woodward .................. 426/332 X |
| 3,123,521 | 3/1964 | Wentworth et al. ............ 8/108.5 X |
| 3,591,515 | 7/1971 | Lovely ........................... 424/130 X |
| 3,745,026 | 7/1973 | Hansen et al. ...................... 426/332 |
| 3,851,077 | 11/1974 | Stemmler et al. ............. 426/310 X |

*Primary Examiner*—S. Leon Bashore
*Assistant Examiner*—Kenneth M. Schor

[57] ABSTRACT

In chilling freshly slaughtered hog carcasses the bleaching effect of a bactericidal spray is eliminated by the use of chlorine dioxide in a concentration sufficient to inhibit the protein synthesis mechanism of bacteria. The concentration required for this purpose, which may be in the range of 5 to 25 parts per million (ppm), is so small that it produces very little if any oxidation; hence the characteristic bleaching effect of chlorine dioxide is avoided. The skin color of carcasses so sprayed is unaffected by the process.

3 Claims, No Drawings

CHLORINE DIOXIDE SPRAY PROCESS FOR CHILLING MEAT CARCASSES

BACKGROUND OF THE INVENTION

Despite careful efforts at sanitation in packing house operations, there will be present on the surface of carcasses of freshly slaughtered hogs substantial quantities of bacteria. It is particularly important that such bacteria not be allowed to multiply while the carcass is still warm; and to the extent feasible, such bacteria should be destroyed.

One process presently in use is described in U.S. Pat. No. 3,745,026 entitled "Carcass Chilling Process". In this process, chlorine and/or hypochlorites are mixed with water to form hypochlorous acid which is sprayed on the carcasses of freshly slaughtered animals starting while they are still warm and continuing intermittently during much of the time required for chilling. This process not only achieves the purpose of controlling and reducing the number of bacteria but also minimizes shrinkage of the meat due to evaporation.

One of the unfortunate effects of the use of this process is the tendency of the chlorine solution to bleach the carcass skin. The use of a chlorine solution in a concentration strong enough to be reliably effective as a bactericide - say approximately 150 ppm - has been found to result in noticeable bleaching. In order to provide a concentration of chlorine sufficiently bactericidal, the concentration must be kept at or near the level which will result in at least slight bleaching; and it would first appear that the effectiveness of bactericidal treatment is signalled by the onset of bleaching. Further, at bactericidal levels, residual chlorine may present a slight odor, or alternatively may react with the bacteria to create an off odor which, although slight and not always present, is nevertheless undesirable.

Sprays of water alone, at sufficient pressure and volume, will of course partly cleanse meat of surface micro-organisms, but such washing of the meat results in its absorbing a great deal of water. This is not to be permitted (Journal of Food Science, Vol. 40 p. 1232).

Chlorine dioxide is well known as a bleaching substance and as an agent for treating water in air conditioning systems, as well as a bactericide. To the best information of the undersigned, it has not prior to the present invention been substituted for chlorine in misting or spraying hog carcasses during chilling. As discussed later herein, the chemical mechanisms by which it may kill germs or bleach cells are found to be different from those of chlorine.

In contrast to chlorine, which when added to water produces hypochlorous acid, chlorine dioxide must as a practical matter be generated at the point of application and mixed into the water. Chlorine dioxide is readily dissolved in water, but does not substantially hydrolize in water. There is only slight hydrolysis to chlorous and chloric acid.

BRIEF SUMMARY OF THE INVENTION

A principal purpose of the present invention is to provide a process which may be used in the chilling of carcasses in substitution for the chlorine spray process heretofore mentioned. A further purpose is to avoid the bleaching effect which tends to accompany the use of a chlorine spray in concentrations required to substantially reduce the bacteria count. A still further purpose is to avoid the presence of undesirable odors, either of chlorine itself or its by-products.

Summarizing generally and without limiting the scope hereof, I have discovered that, in the use of chlorine dioxide for spraying hog carcasses during chilling, the mechanism for destroying bacteria or inhibiting their growth is separate and distinct from the mechanism which might cause bleaching; further, that the effective bactericidal concentration is far below the concentration required for bleaching, or for its reactions which might cause off odors or flavors; and that in consequence, bleaching and off odors and flavors are avoided by using it in concentrations which, though reliable, are smaller than have heretofore been considered feasible.

DESCRIPTION OF THE PREFERRED EMBODIMENT

Hogs are slaughtered in accordance with commercial practices enforced by the Inspection Standards and Regulations staff of the U.S. Department of Agriculture, which provides carefully controlled programs for meat and poultry inspections.

Chlorine dioxide gas is generated with commercially available equipment, such as heretofore been used in adding chlorine dioxide to wash water for use in cleaning vegetables and the like. The gas is generated on-site and introduced into water lines that are connected to spray heads in the chilling room. The warm carcasses are conveyed into the chilling room and sprayed intermittently. For all practical purposes the spray/chill cycles are dictated by USDA regulations; consequently the cycles may be similar to those set forth in U.S. Pat. No. 3,745,026. However, the concentration of chlorine dioxide, dissolved as a gas in the spray water, is maintained at between 5 ppm and 25 ppm.

Examination of the carcasses so sprayed, as certified by the Doctor of Veterinary Medicine serving as inspector in charge of the plant, demonstrated no frosting, icing, or bleaching of any of the carcasses. Their appearance was noticeably more natural than when sprayed with a chlorine spray solution of 100 to 150 ppm. There were no off odors in any instance.

Comparative Bacteriological Tests

To determine the relative bactericidal efficiency of chlorine dioxide gas as compared with chlorine (present in water as hypochlorous acid) tests were made as follows: Bacteriological swabs were taken from the neck and stick areas of the test hogs. Each swab was aseptically delivered into a sterile culture tube containing 10 ml. of sterile 0.1% peptone dilution fluid. In order to avoid TNTC reporting the tubes were serially diluted to $10_3$. Sterile petri dishes were then innoculated with 1 ml. from each dilution, and Standard Plate Count Agar poured into the innoculated dish. Samples were incubated at 35° C. for 48 hours, then counted.

1. Chlorine dioxide solution

Tests were made using chlorine dioxide solution, for the purpose of obtaining a reliable reduction in bacteria count of 90% or more. After preliminary procedures for standardization, the tests were performed at concentrations varying between 5 and 25 ppm of chlorine dioxide solution as follows:

| ppm ClO$_2$ Concentration | Hot Count Average | Cold Count Average | Hours Chill | % Reduction |
|---|---|---|---|---|
| 5 ppm | 19,100 | 461 | 24 | 97.6 |
| 5 ppm | 31,089 | 1700 | 24 | 94.53 |
| 15 ppm | 13,320 | 750 | 24 | 94.4 |
| 15 ppm | 5,365 | 40 | 24 | 99.3 |
| 15 ppm | 9,440 | 1325 | 72 | 86.0 (1) |
| 15 ppm | 40,005 | 300 | 24 | 99.3 |
| 15 ppm | 12,890 | 305 | 24 | 97.6 |
| 15 ppm | 6,359 | 1235 | 24 | 80.6 |
| 15 ppm | 9,040 | 718 | 24 | 92.1 |
| 15 ppm | 4,610 | 444 | 72 | 90.4 (1) |
| 5 ppm | 3,366 | 295 | 24 | 91.2 |
| 5 ppm | 5,515 | 167 | 24 | 97.0 |
| 5 ppm | 3,850 | 252 | 24 | 93.5 |
| 5 ppm | 5,475 | 897 | 24 | 83.6 |
| 25 ppm | 3,007 | 282 | 96 | 90.7 (2) |
| 25 ppm | 5,204 | 237 | 24 | 95.5 |
| 25 ppm | 4,091 | 320 | 24 | 92.2 |
| 25 ppm | 6,639 | 142 | 24 | 97.9 |
| 25 ppm | 6,655 | 225 | 72 | 96.6 (1) |
| 25 ppm | 2,641 | 76.5 | 24 | 97.1 |

(1) normal weekend (2) 3 day holiday weekend
It was concluded that concentrations as low as 5 ppm of chlorine dioxide solution would reliably achieve a desired 90° reduction in bacteria count.
(2) Chlorine To determine the efficacy of chlorine as a bactericide, sodium hypochlorite was used as a chlorine source to form hypochlorous acid in water. The number of ppm of chlorine is shown in the first column; the bacteria counts are shown in the second and third columns; the hours of chilling in the fourth column and the percentage reduction in the fifth column.

| ppm Cl Concentration | Hot Avg. | Cold Avg. | Hour Chill | Percent Reduction |
|---|---|---|---|---|
| 55 | 11350 | 2504.2 | 72 | 77.9 |
| 62 | 3128.8 | 584.3 | 24 | 81.3 |
| 113 | 2619.2 | 627.4 | 24 | 76.1 |
| 103 | 1934.5 | 167.4 | 24 | 91.3 |
| 103 | 4309.4 | 572.7 | 24 | 87.0 |
| 160 | 3419.5 | 245.5 | 24 | 92.8 |
| 120 | 2780.5 | 1362.5 | 24 | 51.0 |
| 108 | 6781.5 | 860.5 | 24 | 87.3 |
| 120 | 7509 | 455 | 24 | 93.9 |
| 113 | NA | — | — | — |
| 123 | 5904 | 278 | 72 | 95.2 |
| 120 | 11570 | 5353 | 24 | 54 |
| 122 | 14897 | 2682 | 72 | 82 |
| 137 | 6694 | 760.5 | 24 | 88.6 |
| 134 | 5728 | 1514 | 48 | 73.5 |
| 124 | 5896 | 2546.5 | 24 | 56.8 |
| 134 | 8512.5 | 1337 | 24 | 84.3 |

It was concluded from the test scatter that in order to effect a 90% reduction of bacteria with comparable reliability, a concentration of 150 ppm of chlorine would be required.

Bleaching Tests

Preliminary tests of chlorine dioxide gas at concentrations of between 5 to 25 ppm produced no bleaching whatsoever. Accordingly, its concentration was increased to 100 ppm and tests at that concentration were contrasted with similar tests utilizing chlorine (present as hypochlorous acid) in the concentration of 150 ppm.

Strips of "fat back" retaining the carcass surface skin were submerged in the solutions for differing periods of time, standardized at thirty minutes and five hours. They were compared with two types of controls: strips similarly immersed in water from the St. Louis Municipal water supply, and control strips which were not immersed in any liquid. Photographs were made to confirm changes in coloration.

In tests made on two successive dates, the results were as follows:
Thirty minutes immersion:
Chlorine dioxide at 100 ppm — no bleaching
Chlorine at 150 ppm — noticeable, slight bleaching
City water — no bleaching
5 hours immersion: noticeable, slight bleaching was present in all specimens immersed, including those in city water.

Freedom from off odors and flavors

Commercially available specimens (for example, hams) from carcasses chilled using chlorine are not usually considered to have substantially undesirable off flavors or odors; nevertheless, chlorine used at concentrations of 150 ppm may sometimes be sensed by a slight odor of either chlorine or of the resultant of the reaction of chlorine with phenols as may be present in the water.

Even in higher concentrations, chlorine dioxide has only a faint odor which does not linger.

It is now recognized that the reaction of chlorine with fatty tissue may result in compounds which may be carcenogenous. Chlorine dioxide does not react with fatty tissue.

Comparison of mechanism of reactions

Tests of sprays using chlorine, present in a water spray as hypochlorous acid, would indicate that there was a correlation between the concentration required for effective bactericidal action and the onset of bleaching. Such correlation appears in the use of chlorine, but not in the use of chlorine dioxide.

The bactericidal action of chlorine is now believed to be due to the effect of the hypochlorous acid in inactivating certain enzymes necessary for the bacteria to utilize glucose and hence to renew and reproduce. The bleaching action of chlorine appears to result from the action of the hypochlorous acid on the pigment in the surface skin.

In contrast, chlorine dioxide gas functions as a bactericide by inhibiting the protein synthesis mechanism of a cell. By blocking the ability of a cell to utilize protein, the cells cannot reproduce and are destroyed. The concentrations at which chlorine dioxide is effective as a bactericide are so small that no bleaching occurs, either as a result of oxidation or other factors. Thus the present discovery may be considered as a finding that the inhibition of protein synthesis by chlorine dioxide will be effective at low concentrations without causing any bleaching. This is achieved by the use of concentrations of chlorine dioxide at less than 50 ppm and preferably in the range of 5 to 25 ppm, with the same bactericidal effectiveness as concentrations of chlorine (as in hypochlorous acid) of six to thirty times as great.

The problems to which this invention is addressed are considered to be of most important in hog slaughtering operations, to which this disclosure makes many references. It will be obvious, however, that the present process is applicable also to slaughtering other meat animals, for example, beef.

We claim:
1. As a non-bleaching use of chlorine dioxide, the method of chilling freshly slaughtered hog carcasses while maintaining an anti-bacterial spray without bleaching the carcass surface skin, which comprises:

A. forming a spray solution of water containing chlorine dioxide gas in a concentration i. effective to prevent the protein synthesis mechanism of bacteria encountered on the hog carcass skin surface, but ii. ineffective to bleach the skin pigment; and B. conveying said hog carcasses to a chilling room and chilling said hog carcasses;

C. intermittently spraying such solution onto said hog carcasses during the period of their chilling for a period long enough to prevent the protein synthesis mechanism, but not long enough to bleach.

2. The method defined in claim 1, wherein the concentration of chlorine dioxide gas in the water solution is less than 50 parts per million.

3. The method defined in claim 1, wherein the concentration of chlorine dioxide gas in the water solution is in the range of substantially 5 to 25 parts per million.

* * * * *